United States Patent
Huston (10) Patent No.: US 7,510,219 B2
(45) Date of Patent: Mar. 31, 2009

(54) THREADED CONNECTION FOR OIL FIELD APPLICATIONS

(76) Inventor: Fred N. Huston, 3614 Plumb St., Houston, TX (US) 77005

( * ) Notice: Subject to any disclaimer, the term of this patent is extended or adjusted under 35 U.S.C. 154(b) by 318 days.

(21) Appl. No.: 11/119,791

(22) Filed: May 3, 2005

(65) Prior Publication Data

US 2005/0248154 A1 Nov. 10, 2005

Related U.S. Application Data (60) Provisional application No. 60/568,783, filed on May 5, 2004.

(51) Int. Cl.
*F16L 25/00* (2006.01)
(52) U.S. Cl. ................. 285/333; 285/334; 285/383; 285/390
(58) Field of Classification Search ......... 285/333–334, 285/329, 355, 383, 390, 334.1
See application file for complete search history.

(56) References Cited

U.S. PATENT DOCUMENTS

| | | | | |
|---|---|---|---|---|
| 570,166 | A * | 10/1896 | Greenfield | 285/53 |
| 2,181,343 | A * | 11/1939 | Reimschissel | 285/339 |
| 2,487,241 | A * | 11/1949 | Hilton | 285/334.2 |
| 2,805,872 | A * | 9/1957 | Routh | 285/55 |
| 3,172,934 | A * | 3/1965 | Krieg | 264/263 |
| 3,298,716 | A * | 1/1967 | Taylor et al. | 285/55 |
| 3,427,050 | A * | 2/1969 | Krieg | 285/55 |
| 3,572,777 | A * | 3/1971 | Blose et al. | 285/334 |
| 3,620,555 | A * | 11/1971 | Hinds et al. | 285/55 |
| 4,373,750 | A * | 2/1983 | Mantelle et al. | 285/55 |
| 4,509,766 | A * | 4/1985 | Yasui et al. | 280/21.1 |
| 4,509,776 | A * | 4/1985 | Yoshida et al. | 285/55 |
| 4,568,113 | A * | 2/1986 | Axford et al. | 285/334 |
| 4,600,219 | A * | 7/1986 | Yoshida et al. | 285/55 |
| 4,706,997 | A * | 11/1987 | Carstensen | 285/13 |
| 4,762,344 | A * | 8/1988 | Perkins et al. | 285/148.19 |
| 5,263,748 | A * | 11/1993 | Carstensen | 285/333 |
| 5,689,871 | A * | 11/1997 | Carstensen | 29/401.1 |
| 5,906,399 | A * | 5/1999 | Noel | 285/55 |
| 6,042,153 | A * | 3/2000 | DeLange et al. | 285/55 |
| 6,273,474 | B1 * | 8/2001 | DeLange et al. | 285/55 |
| 6,561,521 | B2 * | 5/2003 | Janoff et al. | 277/603 |
| 6,811,187 | B2 * | 11/2004 | Otten et al. | 285/93 |
| 2003/0079874 | A1 * | 5/2003 | Otten et al. | 166/250.01 |
| 2003/0156918 | A1 * | 8/2003 | Benedict et al. | 411/81 |
| 2004/0046388 | A1 * | 3/2004 | Slack et al. | 285/333 |

OTHER PUBLICATIONS

The Free Dictionary by Farlex [online], [retrieved on Dec. 12, 2007], Retrieved from the Internet: http://www.thefreedictionary.com/abuts.*

(Continued)

*Primary Examiner*—Aaron M Dunwoody
*Assistant Examiner*—Fannie Kee
(74) *Attorney, Agent, or Firm*—Jones, Tullar & Cooper, P.C.

(57) ABSTRACT

An interconnection for oil field tubular goods operates in a self sealing manner in response to internal pressures which might otherwise cause leakage through couplings or joints. Each coupling sleeve includes an interior fulcrum ring fitted between the nose ends of the tubing or casing, and centrally engaging a fulcrum seating zone centered in the sleeve. Internal pressures tend to bend the ends of the fulcrum ring outwardly toward clearance or relief spans on each side of the fulcrum zone. This deflection increases the contact force and enhances the metal-to-metal seal between the end faces of the fulcrum ring and the pin end faces.

16 Claims, 5 Drawing Sheets

OTHER PUBLICATIONS

Merriam-Webster Online Dictionary [online], [retrieved on Dec. 12, 2007], Retrieved from the Internet: http://www.m-w.com/dictionary/end.*

Merriam-Webster Online Dictionary [online], [retrieved on Dec. 12, 2007], Retrieved from the Internet: http://www.m-w.com/dictionary/face.*

* cited by examiner

FIG. 7
FORMING THREADED ELEMENTS

FIG. 8
COUPLING MAKEUP

THREADED CONNECTION FOR OIL FIELD APPLICATIONS

PRIOR APPLICATION

This application claims priority based on a prior provisional application of F. N. Huston, Ser. No. 60/568,783 filed May 5, 2004.

FIELD OF INVENTION

This invention relates to tubing and casing interconnection systems for oil field applications and particularly to interconnections which are to provide high resistance to leakage under internal pressure without undue penalties in terms of cost or mechanical properties.

BACKGROUND OF THE INVENTION

In the current state of the art in threaded connections for oil field tubular goods, it is important to have relatively easy interconnectability, good mechanical properties and also resistance to leakage under high internal pressures and high tensile strains. Preferably this is to be done without incurring substantial cost penalties relative to tubular goods standardized in accordance with specifications set by the American Petroleum Institute (API). Drilled oil and gas wells are becoming of increasingly longer length, are arranged in complex geometries, and are often directionally controlled to curve to a production zone. In addition they are likely to be required to operate in corrosive environments at increasingly higher pressures and temperatures. It sometimes is unavoidable to have to use "premium" tubing with special threads or seals, or both, to meet the strength and leak resistance specifications that are needed.

In a drilled bore hole for petroleum production an outer string of relatively larger diameter tubular elements, called the casing, is joined together by using interspersed couplers. The casing is left in place after the well is completed, and is externally sealed by surrounding cement. It must have physical integrity under the high loads, forces, pressure and corrosive conditions that may be encountered. Joints in the casing string are particularly subject to failure. The size and weight of the casing are considerable, but the installation, being essentially static, and usually encased in concrete, is relatively undisturbed once in place. However, leakage of high pressure gas into the annulus between the inner tubing and the casing can give rise to external environmental damage if it penetrates outside the casing. Self-sealing interconnections in the casing can limit or eliminate this problem, which can create major environmental and economic consequences.

A string of production tubing of smaller diameter is installed within the length of the casing, and may repeatedly be withdrawn and disassembled for service or replacement. Petroleum products can be lifted upwardly by down hole pressure alone, or more typically by pumping, as with a rotary or reciprocating pump. In either event a sucker rod string extends within the production tubing from the surface down to a pump in the production zone. For flow control, down hole packers, sensors and other elements may be located in and adjacent the production zone.

Heat, internal pressures and corrosive chemicals in the deep down hole installations that are now being widely employed militate against mechanically secure leak-free connections. Tensile strains from the weight of long lengths of tubing increase the likelihood of leakage under high internal pressures. Countering these adverse conditions without at the same time introducing major added costs is an objective of this invention.

SUMMARY OF THE INVENTION

An interconnection for tubing or casing strings comprises a combination of precisely matched male and female threads, on tubular elements and coupling sleeves respectively, together with an interior pressure responsive sealing device. The pressure responsive device comprises an interior element providing a seating point or zone at the center of the coupling, with adjacent radial clearance spans and a force deflectable fulcrum ring centered and contacting the sealing zone. The fulcrum ring is between and its ends contact the opposing end faces of the tubular elements. The seating zone may protrude inwardly from the sleeve or outwardly from the ring, but engagement in the central region is with a press fit. The threads in the center of the coupling, on each side of the fulcrum are truncated or relieved to provide a radial clearance gap of small but adequate dimension for outward radial deflection of the ring ends.

The fulcrum ring is preferably press fitted against a seating region in the center of the coupling sleeve, and properly positioned axially by measuring the depth of the penetration while relying on near mirror image matching of the tapers and forms of the mating threads of the pin ends and coupling to assure proper engagement at that position. These factors assure very close control of axial positioning of the interconnection, because when the fulcrum ring is in abutment with the first pin end, it properly limits the position of the second inserted pin end. The male threads on the tubular elements and the female threads interior to the coupling sleeve match within 0.0005" tolerance in thread profile, dimension and taper. These surfaces are also work hardened by the impact of high velocity particles, as by shot peening, and receive lubricant particulates which enable proper engagement despite the close dimensional fit, which also provides a basic metal-to-metal seal.

In a completed interconnection, therefore, the opposing end faces of the two tubular elements are physically separate, but they forcefully contact the end faces of the fulcrum ring and provide a metal-to-metal seal limiting or eliminating leakage due to internal pressure. As pressure builds up internally, radial forces act to bend both ends of the ring outwardly into the clearance spaces on each side of the fulcrum zone, introducing high force line contact between the end faces of the fulcrum ring and the opposing end faces of the tubular elements and enhancing the metal-to-metal seal. The resultant connection is resistant to internal pressures both in the short and long term use.

Methods in accordance with the invention prepare the elements of the connection for maximization of a metal-to-metal seal barrier and precise dimensional positioning of the elements for the pressure responsive closure device. The threads are machined, lapped and polished to a near mirror image fit and prepared for makeup by preliminary surface hardening leaving micro-indentations which receive particulate lubricants. The connection is made up using an axial dimensional digital probe or mechanical dial indicator which, together with the matching threads, assures proper placement of the elements relative to the fulcrum ring and each other.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
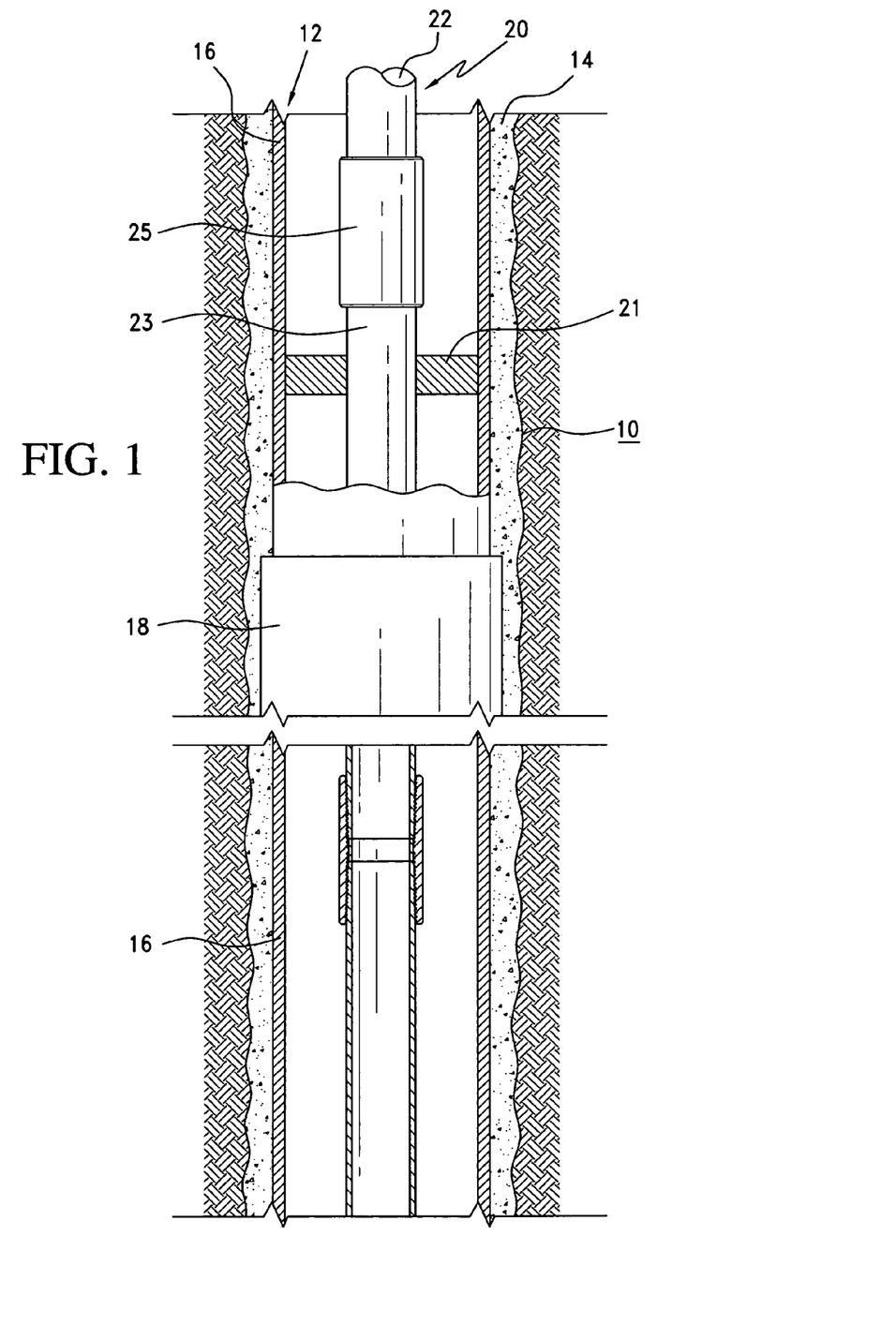
FIG. 1 is a simplified depiction of tubing and casing strings in a drilled hole for petroleum production applications which may be required to resist internal pressures.

The general configuration of a modern drilled well for oil and gas applications is shown in FIG. 1, to which reference is now made. A drilled bore hole 10 is of a width appropriate for the contemplated production, typically 1-2 feet or more in diameter. The drilling may be directionally controlled so as to curve the well to reach specific oil bearing regions, and drill strings may be branched to reach different production zones. Well depths may extend for as many as 30,000 ft. underground. When a production zone level is reached, extraction depends on whether the petroleum products are under significant pressure or have to be artificially lifted to the surface using a pump. If adequately pressurized, the production zone is sealed off from the casing by packer elements. Pumping instead involves use of appropriate ones of a variety of techniques and implementations, including the accessory mechanisms such as perforators, rotary and reciprocating pumps, and the like. As the drilled bore 10 goes deeper, the well is lined with a casing string 12 comprising large diameter pipe, e.g. 4½-24" in diameter that ultimately extends through the entire bore hole and is set in place permanently with a surrounding cement 14. This large diameter casing 12, which weighs thousands of tons, requires high strength and sealing integrity, and usually comprises sleeve couplers which interconnect standard length casing sections into a string. The individual elements of casing 16 and the interconnecting couplers 18 may be API standard, depending upon the conditions expected in the bore hole, or they may utilize the pressure responsive arrangement of the present invention.

A production tubing string 20 is assembled of smaller diameter elements, adequately small to be freely positioned within the casing string 12. Thus the tubing string 20 usually has an intermediate annular spacing from the casing 12, usually maintained by centralizers 21 at preselected regions along the length of the tubing string 20. By way of example production tubing may be of 1½" to 7⅝" in diameter. Since the tubing string is for maintaining petroleum production, it must occasionally be withdrawn to the surface and disassembled for service, repair or inspection, which can happen repeatedly during the operative life of the string. The down hole conditions, particularly at the great depths that are now used for subterranean and sub-sea installations very often require that the tubing string resist highly corrosive chemical environments, temperatures and mechanical stresses, without any leakage and preferably without any mechanical failure or disruption. In all such strings, a typical pair of adjacent tubing sections 22, 23 are coupled together by a coupler or sleeve 25.

Figure 4:
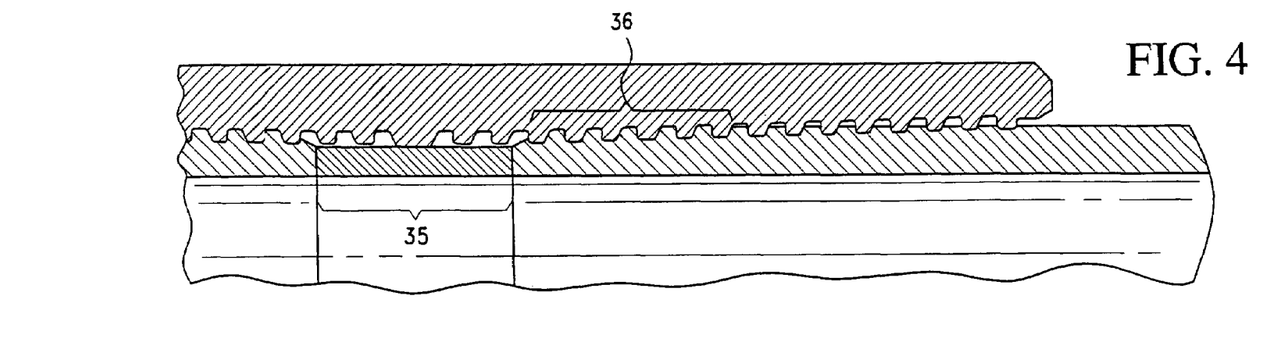
FIG. 4 is an enlarged fragmentary view of the thread profile of tubular elements and coupling sleeve in an interconnection in accordance with the invention.

In accordance with the invention, the matching threads of the ends of the tubing elements 22, 23 and the internal threads of the coupling sleeve 25 may be as shown in FIG. 4.

The thread illustrated in FIG. 4 is a modified buttress thread having a radiused stab flank with a curved profile and a load flank at 90° to the longitudinal axis of the thread. The thread taper in this example for a 2.875" standard coupling is 0.050" per inch, and the nominal thread height is 0.050" with about 6 full threads (specifically 6-⅔) per inch. The coupling sleeve 25 in this example then is 5.250" long and the length of thread from the end of the coupling sleeve to a central span region 35 is 2.25", with the central span region 35 being 0.750". This general thread configuration is also shown in overall view in FIG. 2 as well as the fragmentary view of FIG. 4. The load flank of 90° provides superior load bearing characteristics, and the large radius of the stab flank provides an area sufficient to eliminate galling due to pipe weight doping makeup. The thread profile shown has been shown to be advantageous, but it should be recognized that other thread configurations, including special "premium" threads and API thread pipes, including "V" threads with 60° included flank angles and rounded roots and crests and a modified square acme thread commonly referred to as "buttress" can be used.

Figure 3:
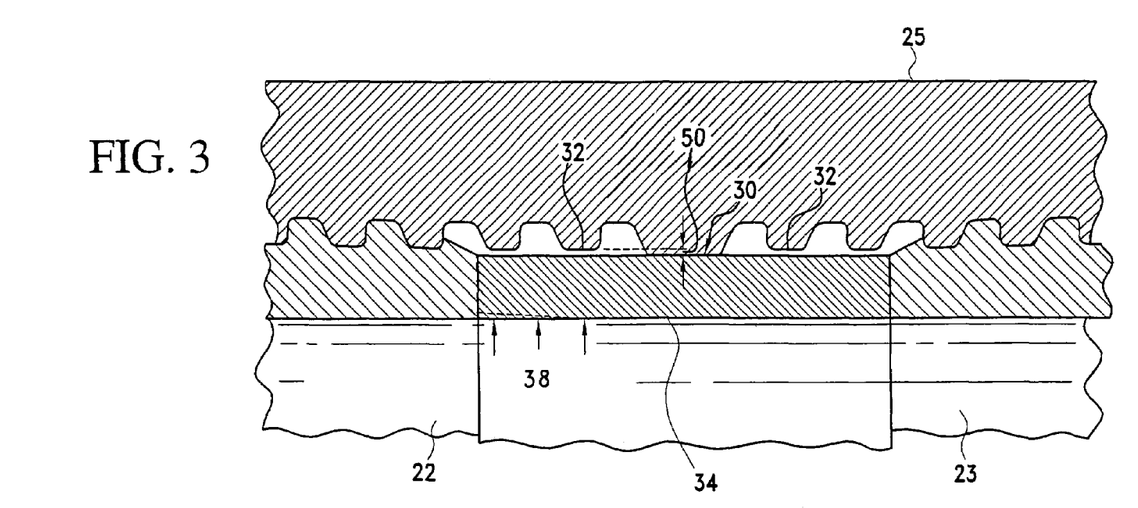
FIG. 3 is an enlarged side view of the central region of the interconnection of FIG. 2, illustrating by dotted lines deflections of the fulcrum ring under internal pressure.

As seen particularly in FIGS. 3 and 4, the converging thread cones on the coupling sleeve 25 come together at a central span 35, wherein the threads merge, in this example, to form a central seating area or fulcrum zone 30 that extends inwardly from the inner diameter of the coupling sleeve 25. Adjacent each side of the interior seating over a fulcrum zone 30 within the central span are truncated threads 32, these providing a clearance or span a relief for an interior ring, here with a gap 50 of about 0.010" in the radial direction, which gap 50 is shown, in an exaggerated manner, by the dashed line in FIG. 3. A ring 34, here termed a "fulcrum ring" is inserted into the central span region 35 and is press fit into engagement with the central seating area 30. The fulcrum ring 34 provides in this combination a sealing function in addition to the metal-to-metal seals provided by torque rings in the prior art. Proper position is best assured by measuring the depth of insertion of a first tubing element (e.g. 22) into the coupling sleeve 25. The fulcrum ring can then be inserted into abutment with the first inserted pin end. The length of the ring 34 coincides precisely with the central span 35, as seen in FIG. 4, between the tubing elements 22, 23. The second tubing element 23 is then inserted into abutment with the ring 34. On proper makeup, the ring 34 is under compressive stress from both sides by the adjacent tubing elements 22, 23. As depicted in FIG. 4, the thread profiles of the male threads and female threads are in full engagement for a number of threads adjacent the central span and thereafter crests and roots do not fully mesh. This region of full thread engagement is referred to herein as a "near mirror image" engagement, because of the mode of operation and finishing of the threads.

The flat end faces of the ends of the fulcrum ring 34 engage the end faces of the pin ends of the tubular elements 22, 23 with an axial force determined by the makeup process. This, along with the seal provided by the near mirror image threads, is more than adequate to resist normal internal pressures. As internal pressures increase, however, they may become sufficient to bend the longitudinal ends 38 of the fulcrum ring 34 outwardly into the adjacent clearance span gaps or reliefs in the coupling sleeve 25, about the fulcrum point provided by the central seating area. A central length of the fulcrum ring 34 engages the central seating area 30 of the coupling sleeve 25. It also has fulcrum ring longitudinal ends positioned adjacent the clearance gaps of the sleeve 25. As may be seen in FIGS. 3 and 6, the central length of the fulcrum ring 34 is less than a span length of each of the longitudinal ends of the fulcrum ring. This enhances the metal-to-metal seal, because the curvature of the fulcrum ring 34 end faces increases the longitudinal forces between the opposing end face surfaces, particularly along an inner circumference. Consequently, this high force line contact acts to enhance the metal-to-metal seal in an automatically self sealing manner.

Figure 5:
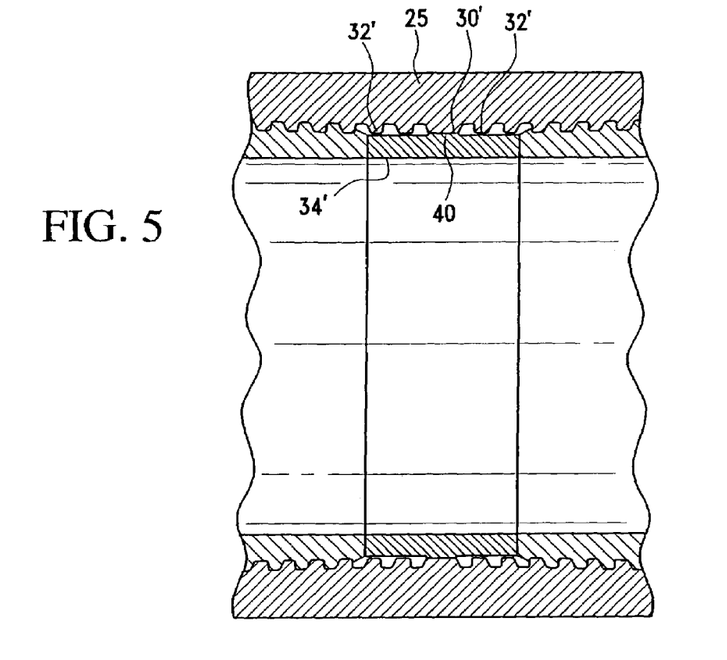
FIG. 5 is a fragmentary sectional view of an alternate configuration in accordance with the invention.
Figure 6:
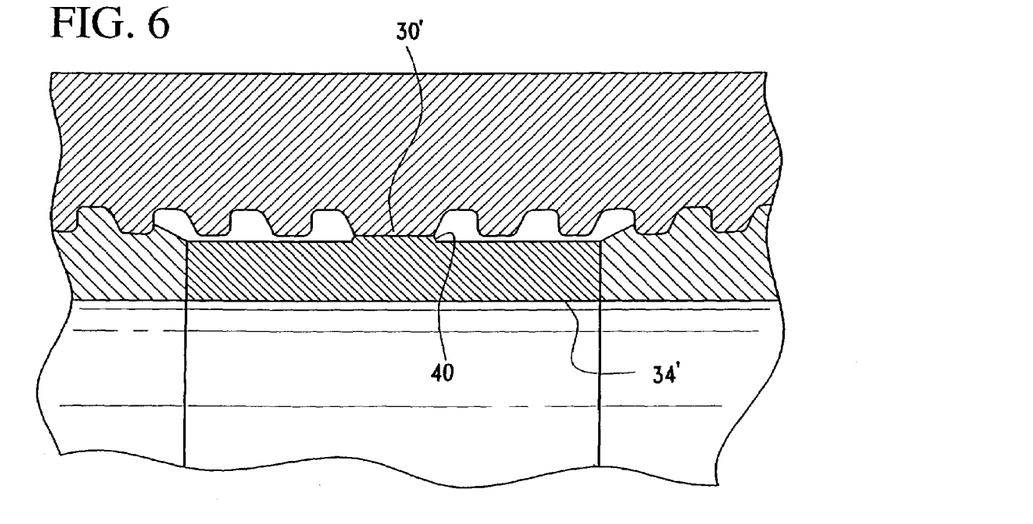
FIG. 6 is an enlarged cross-sectional view of the example of FIG. 5.

In another example in accordance with the invention, referring to FIGS. 5 and 6 the inner diameter at the center of the coupling sleeve 25, provides a seating zone 30' that is slightly smaller than the inner diameter of the adjacent clearance spans provided by the truncated threads 32'. The fulcrum ring 34' in this instance has an outwardly extending projection in the form of a fulcrum band 40. The fulcrum band 40 mates with the seating zone 30' as in the example of FIGS. 1-4 with a press fit. The fulcrum ring 34' is again free to bend, at its ends, toward the clearance regions in response to internal pressures.

Again, therefore, internal pressures act to enhance the metal-to-metal seal, and increase the tolerance of the string for stressful conditions, which may comprise high tensile strains, high internal pressures, or both.

Figure 2:
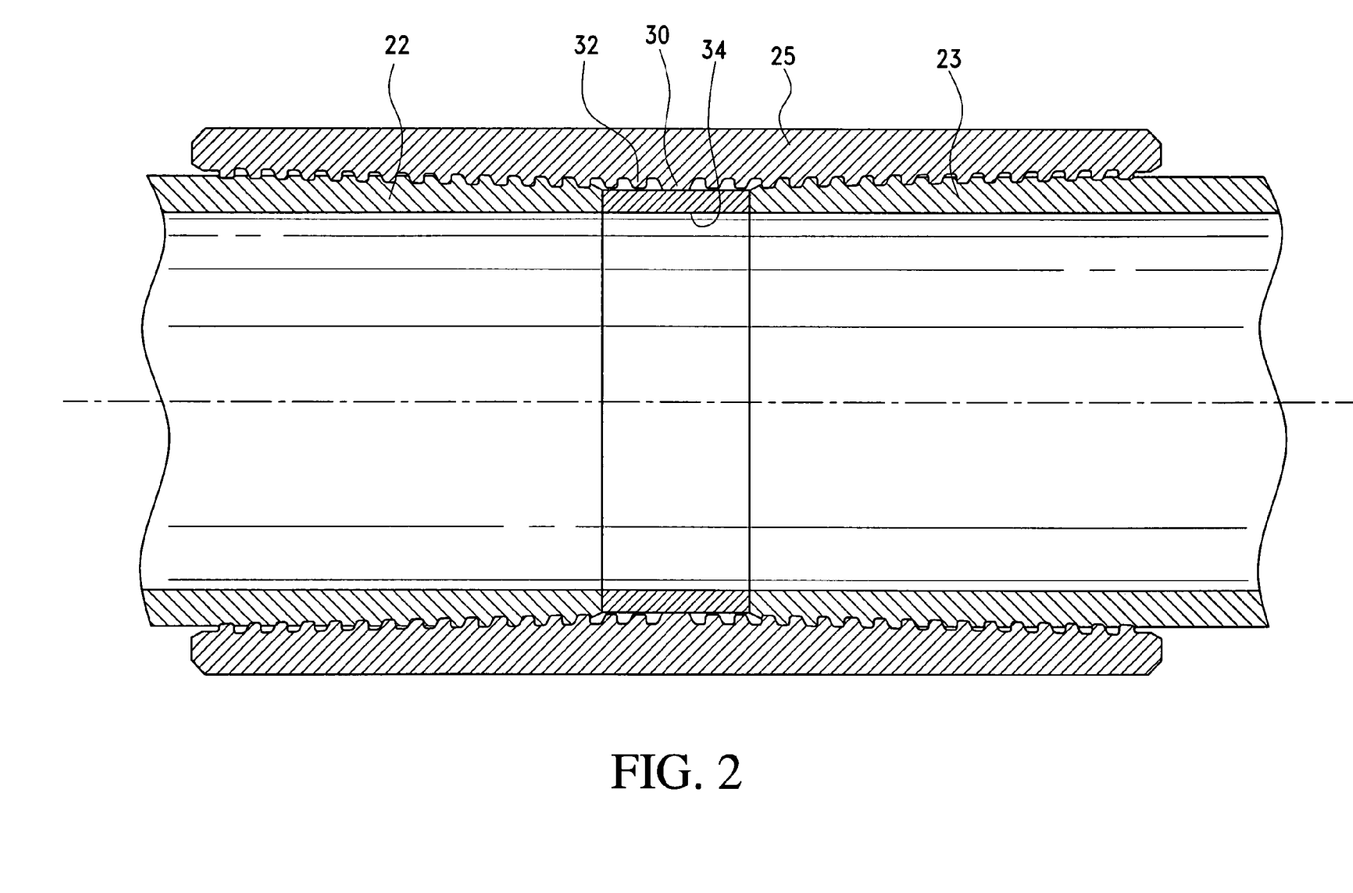
FIG. 2 is a side sectional view of an interconnection in accordance with the invention.
Figure 7:
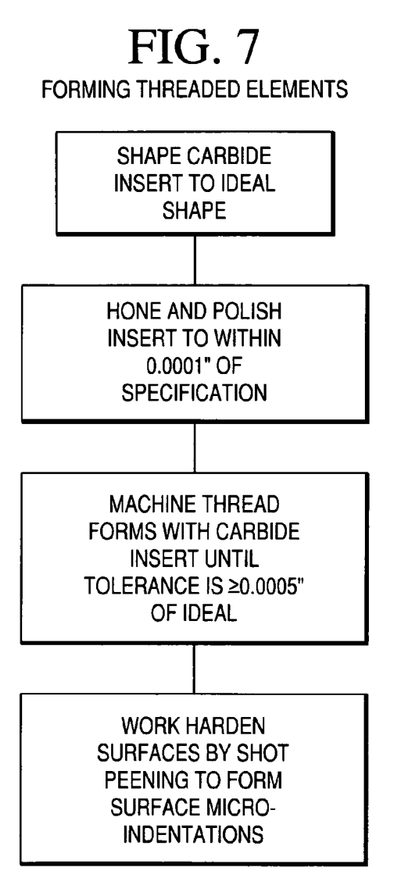
FIG. 7 is a block diagram of steps which may be used in preparing the threaded surfaces and FIG. 8 is a block diagram of steps employed in setting up interconnections in accordance with the invention.

As shown in FIG. 7, the needed precision fit is obtained by first using an accurately formed carbide cutting insert to remove material to form the thread of FIGS. 2 and 4 in the male and female elements.

Forming the mating threads entails more than cutting the thread shape into the end of the tubing element and coupling sleeve. The precision tool that is used to form the thread shapes may cut a conventional apex or modified V thread, or a modified buttress shape as shown in FIGS. 2-4. The modified buttress thread has a stab flank with a smooth radius, which reduces proclivity to galling. At the same time the 90° load flank provides high tensile strength. In preparing the cutting tool for machining, the thread form of the cutting tool is brought to very near finished dimension using a grinding process. Thereafter the form is lapped and polished to final dimension using a compound consisting of 80% jewelers rouge and 20% diamond dust. This brings the cutting tool insert to within 0.0001" of the ideal shape. The "near mirror image" of the two (male and female) threads is effected by using the cutting tool insert only until wear extends the variation to 0.0005" or less of the ideal. The process is carried out so that the smallest feasible clearance between male and female thread forms is established as machined. When assembled the threads form a metal-to-metal thread seal in which high radial compressive loads force the near mirror image thread forms into each other along the length of the full form thread helix.

Figure 8:
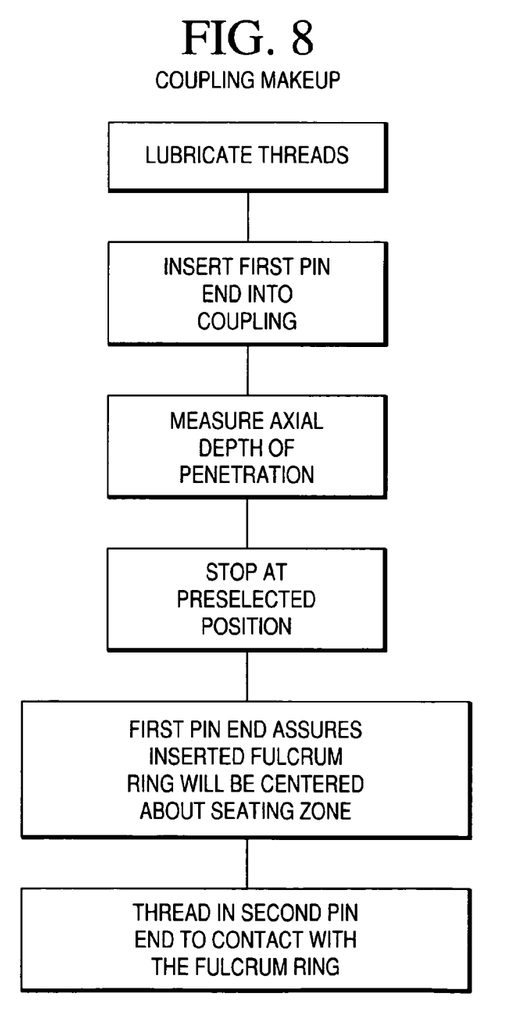

Before makeup of a connection, however, the thread surfaces are work hardened by shot peening, which provides micro-indentations in the surface. The micro-indentations confine particulates which are in a conventional lubricant, which eases makeup as the first pin end is inserted. As seen in FIG. 8, the first pin end is precisely dimensionally located by using a linear probe to monitor axial position. At a predetermined point the penetration of the first pin end assures that the fulcrum ring 34 will be centered in the middle of the central span, opposite the fulcrum zone 30 or 30' and thereby centered relative to the clearance surfaces on each side.

The near mirror image of the male and female threads assures that when the first pin is properly positioned the full form threads are also fully engaged. The end face of the first pin is then properly positioned against the first pin to center the fulcrum ring 34 longitudinally. When the fulcrum ring 34 is installed it has a press fit with the inner diameter surface of the seating zone 30. The second pin end is installed into end-to-end engagement with the fulcrum ring 34, making a symmetrical connection with uniform prestress.

The basic metal-to-metal seal of mating thread faces provides adequate sealing against internal pressures of a moderate amount. As internal pressure increases the two longitudinal ends of the fulcrum ring displace radially outwardly (FIG. 3) as shown symbolically by dotted lines. This action is resisted immediately by the end faces of the pin ends, creating the high force line contact and the supplementary pressure actuated metal-to-metal seal that enhances resistance to ever higher internal pressures.

Pressures of as much as 15,000 psi might be encountered in a deep hole system, but are readily resisted by this closure device and thread seals. However, if the pressure drops back to a lower level, the fulcrum ring has not been distorted beyond its yield point, and pressure resistance continues to be maintained at lower pressures because of its high force compliance.

Although various forms and modifications have been shown and described, it will be appreciated that the invention is not limited thereto, but includes all variations and alternatives within the scope of the appended claims.

The invention claimed is:

1. A self sealing pressure responsive coupling device for joining two oil field tubular elements having male threaded ends terminating in end faces, the coupling device comprising:
   a coupling sleeve having female threaded end sections for matingly receiving the male threaded ends of the tubular elements and having an interior longitudinal span between the threaded female end sections, the interior longitudinal span including a central interior seating region of a first inner diameter, said female threaded end sections including a pair of spaced clearance regions of a second inner diameter greater than said first inner diameter; and
   a fulcrum ring having spaced fulcrum ring longitudinal ends, each having a longitudinal end span length and a central length between the spaced fulcrum ring longitudinal ends and corresponding to the interior longitudinal span of the coupling sleeve, the fulcrum ring central length being less than each of said longitudinal span end lengths and having a radial outer surface engaging the central interior seating region of the coupling sleeve, end faces of the fulcrum ring being engaged by the end faces of the two tubular elements inserted in the coupling sleeve, internal pressures within the fulcrum ring and the tubular elements acting to bend the longitudinal ends of the fulcrum ring radially outwardly into the clearance regions of the coupling sleeve, the radial bending of the fulcrum ring longitudinal ends increasing a metal-to-metal contact force between the end faces of the fulcrum ring and the end faces of the two tubular elements.

2. A self sealing coupling device as set forth in claim 1 above, wherein the central interior seating region of the coupling sleeve engages the fulcrum ring with a press fit, wherein the two tubular elements have a selected inner diameter and the fulcrum ring has the selected inner diameter, and wherein the fulcrum ring and the two tubular elements have flat end faces lying in planes perpendicular to a central axis of the tubular elements.

3. A self sealing coupling device as set forth in claim 2 above, wherein the pair of clearance regions of the coupling sleeve comprise regions of truncated female threaded end section threads.

4. A self sealing coupling device as set forth in claim 2 above, wherein the fulcrum ring has a substantially constant outer diameter along its length, and wherein the central interior seating region comprises a central projection extending radially inwardly relative to the clearance regions in the body of the coupling sleeve.

5. A self sealing coupling device as set forth in claim 2 above, wherein the fulcrum ring includes a projecting fulcrum central region on an outer diameter of the central length, said projecting fulcrum central region being adapted for mating with the central interior seating region of the coupling sleeve.

6. A self sealing coupling device as set forth in claim 2 above, wherein the two tubular elements and the coupling sleeve each have thread profiles with 90° load flanks, large radius stab flanks and low taper angles, and wherein the male and female threaded ends have near mirror images.

7. A self sealing coupling device as set forth in claim 6 above, wherein the two tubular elements have upset ends and the threads have a 0.050 inch per inch taper, 0.050 inch thread heights and about 6 full form threads per inch.

8. A threaded connection for drilled hole tubing and casing for oil and gas field applications, comprising:
  a pair of oil field tubular elements, each having a central axis and a male threaded end with an end face transverse to the central axis;
  a coupling sleeve with integral longitudinally spaced threaded interior surfaces each adapted for receiving one of the pair of tubular elements inserted from opposite directions into the coupling sleeve, the coupling sleeve including an integral central interior seating region of a first inner diameter and with the longitudinally spaced threaded interior surfaces having a second inner diameter greater than the first inner diameter, and
  a central fulcrum ring disposed between, and abutting the end faces of the pair of tubular elements, the fulcrum ring having spaced fulcrum ring longitudinal ends each having a longitudinal end span, and a central length between the spaced fulcrum ring longitudinal ends, said fulcrum ring central length being less than each of said longitudinal end span lengths, the central length of the fulcrum ring being centered about the central interior seating region and circumferentially engaging the central interior seating region of the coupling sleeve, whereby internal pressures within the fulcrum ring and the tubular elements will bend the longitudinal ends of the fulcrum ring radially outwardly relative to the coupling sleeve central interior seating region and toward the adjacent surfaces of the second inner diameter on the coupling sleeve and to bring end faces of the central fulcrum ring into high force line contact engagement with the end faces of the pair of tubular elements.

9. A threaded connection as set forth in claim 8 above, wherein the male threaded ends of the pair of tubular elements, and the coupling sleeve spaced threaded interior surfaces have a near mirror image fit, and wherein the first inner diameter of the central interior seating region of the coupling sleeve adjacent the fulcrum ring mates, with a press fit, with the adjacent exterior region of the fulcrum ring.

10. A threaded connection as set forth in claim 9 above, and wherein the central fulcrum ring has a substantially constant diameter and the central interior seating region comprises a radially inward central projection in the coupling sleeve.

11. A threaded connection as set forth in claim 9 above, wherein the central fulcrum ring has a central outward projection and the central interior seating region of the coupling sleeve has said first inner diameter that is less than said second inner diameter of the longitudinally adjacent inner surfaces.

12. A threaded connection as set forth in claim 9 above, wherein a portion of thread crests on the threaded interior surfaces of the coupling sleeve adjacent each end of the central interior seating region are truncated to provide the longitudinally adjacent inner surfaces of the second inner diameter as a bending clearance for the end sections of the fulcrum ring.

13. A threaded connection as set forth in claim 12 above, wherein the male threaded ends of the pair of tubular elements and the spaced threaded interior surfaces of the coupling sleeve have shot peened surfaces for facilitating retention of lubricants with solid particles and for facilitating threaded engagement of the pair of tubular elements and the coupling sleeve.

14. A threaded connection as set forth in claim 13 above, wherein the male threaded ends of the pair of tubular elements and the spaced threaded interior surfaces of the coupling sleeve are dimensioned to mate to within less than 0.0001" on full makeup of the threaded connection.

15. A threaded connection as set forth in claim 14 above, wherein the threads on the male threaded ends and on the spaced threaded interior surfaces have a 90° load flank and a radiused stab flank, and wherein the central fulcrum ring end sections have end faces which engage the end faces of the tubular elements, and further wherein the central fulcrum ring end section end faces bend into line contact with the end faces of the pair of tubular elements in response to internal pressure exerted on the central fulcrum ring.

16. The method of assembling a string of tubular elements for drilled hole oil field installations using couplers between pairs of elements comprising the steps of:
  preparing couplers in the form of cylindrical sleeves having interior female threads tapered oppositely from the ends of the coupler to a central section of predetermined inner diameter bounded at each end by radial clearance sections of larger diameter;
  preparing threaded pin elements having end sections with male threads mating with the female threads of the sleeves within 0.0005" when fully made up;
  work hardening the threaded surfaces by bombarding the surfaces to provide micro-indentations therein and puffing the surfaces of the parent material of the threaded coupler and pin element ends in a compressive state;
  applying lubricant including microparticles on the thread surfaces;
  threading a first tubular pin element into position to a selected degree of dimensional penetration into the coupler;
  inserting a fulcrum ring into the coupler against the end of the first tubular pin element, the fulcrum ring mating with the inner diameter of the central section of the coupler xvith a press fit and spanning the relief surfaces on each side with a radial clearance of 0.01" or more, and
  inserting the second tubular pin element into the coupler into end-to-end engagement with the fulcrum ring.

* * * * *